(12) United States Patent
Bolar

(10) Patent No.: US 12,162,058 B2
(45) Date of Patent: Dec. 10, 2024

(54) HYDROFORMING OF ALUMINUM EXTRUSIONS FOR AUTOMOTIVE BATTERY TRAY STRUCTURES

(71) Applicants: MAGNA INTERNATIONAL INC., Aurora (CA); Nikhil Bolar, Royal Oak, MI (US)

(72) Inventor: Nikhil Bolar, Royal Oak, MI (US)

(73) Assignee: MAGNA INTERNATIONAL INC., Aurora (CA)

( * ) Notice: Subject to any disclaimer, the term of this patent is extended or adjusted under 35 U.S.C. 154(b) by 349 days.

(21) Appl. No.: 17/788,062

(22) PCT Filed: Dec. 22, 2020

(86) PCT No.: PCT/US2020/066534
§ 371 (c)(1),
(2) Date: Jun. 22, 2022

(87) PCT Pub. No.: WO2021/133763
PCT Pub. Date: Jul. 1, 2021

(65) Prior Publication Data
US 2023/0048459 A1 Feb. 16, 2023

Related U.S. Application Data
(60) Provisional application No. 62/953,243, filed on Dec. 24, 2019.

(51) Int. Cl.
*B21D 26/00* (2006.01)
*B21D 26/021* (2011.01)
(Continued)

(52) U.S. Cl.
CPC ........ *B21D 26/021* (2013.01); *H01M 50/224* (2021.01); *H01M 50/249* (2021.01);
(Continued)

(58) Field of Classification Search
CPC .... B21D 26/021; B21D 26/031; B21D 26/00; H01M 50/249; H01M 50/224;
(Continued)

(56) References Cited

U.S. PATENT DOCUMENTS

| 6,543,266 B1 * | 4/2003 | Jaekel ..................... F16F 7/125 72/61 |
| 2008/0268276 A1 * | 10/2008 | Ueno ..................... B21D 53/88 428/593 |

(Continued)

FOREIGN PATENT DOCUMENTS

| CN | 102 092 267 A | 6/2011 |
| DE | 10 2014 004183 A1 | 9/2014 |

(Continued)

OTHER PUBLICATIONS

Extended European Search Report dated Dec. 5, 2023, which issued in the corresponding European Patent Application No. 20904348.8.

*Primary Examiner* — James A Shriver, II
*Assistant Examiner* — Hilary L Johns
(74) *Attorney, Agent, or Firm* — Dickinson Wright PLLC

(57) ABSTRACT

A structural component for a vehicle may include an extrusion that is extruded into a first state and then expanded into a second state. The extrusion in the first state has a reduced size relative to a desired final size. The extrusion in the first state is placed within a die that defines the desired final size. Pressurized water is distributed within internal cells of the extrusion in the first state such that the walls defining the internal cells are expanded into engagement with the surface of the die, thereby creating surface features or sealing interfaces with tight tolerances. The relative shape of the die and the extrusion in the first state defines an open space therebetween, into which the extrusion may expand to define (Continued)

the final shape. Some of the internal cells may be plugged such that they are not provided with pressurized water.

20 Claims, 8 Drawing Sheets

(51) Int. Cl.
  *H01M 50/224* (2021.01)
  *H01M 50/249* (2021.01)
  *H01M 50/271* (2021.01)
  *B60L 50/64* (2019.01)
(52) U.S. Cl.
  CPC ............ *H01M 50/271* (2021.01); *B60L 50/64* (2019.02); *H01M 2220/20* (2013.01)
(58) Field of Classification Search
  CPC ............ H01M 50/271; H01M 2220/20; H01M 50/20; H01M 50/204; B60L 50/64; B60K 1/04

USPC ........................................................ 180/68.5
  See application file for complete search history.

(56) References Cited

U.S. PATENT DOCUMENTS

| 2014/0014428 A1* | 1/2014 | Yanagi .................... B60K 1/04 |
| | | 180/68.5 |
| 2014/0049070 A1 | 2/2014 | Young et al. |
| 2018/0370570 A1* | 12/2018 | Ayukawa ........... B62D 25/2018 |

FOREIGN PATENT DOCUMENTS

| JP | H07 117730 A | 5/1995 |
| JP | 2005 238254 A | 9/2005 |
| JP | 3 794680 B2 | 7/2006 |
| JP | 3832381 B2 * | 10/2006 |
| JP | 4 396258 B2 | 1/2010 |
| JP | 2013 010140 A | 1/2013 |
| JP | 5 989431 B2 | 9/2016 |

\* cited by examiner

HYDROFORMING OF ALUMINUM EXTRUSIONS FOR AUTOMOTIVE BATTERY TRAY STRUCTURES

CROSS-REFERENCE TO RELATED APPLICATIONS

This U.S. National Stage Patent Application claims the benefit of PCT International Patent Application Serial No. PCT/US2020/066534 filed Dec. 22, 2020 entitled "HYDROFORMING OF ALUMINUM EXTRUSIONS FOR AUTOMOTIVE BATTERY TRAY STRUCTURES" which claims the benefit of and priority to U.S. Provisional Patent Application Ser. No. 62/953,243 filed on Dec. 24, 2019, titled "Hydroforming Of Aluminum Extrusions For Automotive Battery Tray Structures," the entire disclosure of which is hereby incorporated by reference.

FIELD OF THE DISCLOSURE

The present disclosure relates to automotive structures. More particularly, the present disclosure relates to extruded chassis or body structures.

BACKGROUND OF THE DISCLOSURE

Automotive vehicles, including internal combustion engine vehicles and electric vehicles, include a variety of structural components that are manufactured of formed in a variety of ways. For example, a vehicle chassis structure may be formed by joining by joining various structural components together to form or define a cradle structure for holding various components of the vehicle, such as the engine, transmission components, motors, HVAC systems, and the like.

Structural components may be made from a variety of materials, including steel, aluminum, composites, alloys, etc., each of which have various benefits depending on the needs of the component, such as low weight, high strength, high stiffness, thermal conductivity, etc. The selection of material may depend on a combination of factors.

In many cases, materials may be manufactured or formed and then joined together to form a complex structure. In some cases, material may be formed into a single-piece structure through additive manufacturing methods, or machining of a material to remove material in some areas to leave behind the final shape of the component. Components may be cast from a die, forged, extruded, or other methods.

Due to vehicle space requirements and assembly requirements, various structural components may have tight tolerance requirements, thereby requiring costly and time consuming manufacturing processes. In some cases, meeting tight tolerance requirements may require the use of additional material overall.

In some cases, manufacturing to a tight tolerance may not be feasible, thereby resulting in parts that cannot meet tight tolerance and requiring tradeoffs in other connected parts or increased assembly time to ensure a proper fit for components.

Accordingly, in view of the above, improvements can be made to the manufacturing of vehicle structural components.

SUMMARY

In one aspect a structural component for a vehicle is provided. The structural component includes an extrusion extending along a length thereof, the extrusion defining a cross-sectional shape; a plurality of intersecting wall portions of the extrusion; a plurality of internal cells defined by the plurality of wall portions, the cells extending along the length of the extrusion; a plurality of exterior surface portions of the extrusion; wherein the extrusion has a first state having a first cross-sectional size and shape; wherein the extrusion has a second state, wherein the cross-sectional size and shape is expanded relative to the cross-section of the extrusion in the first state.

In one aspect, the structural component is a battery tray, wherein the at least one extrusion comprises a first extrusion and a second extrusion, wherein the first and second extrusion define, at least in part, first and second sidewalls of the battery tray, wherein the first and second sidewalls are on opposing lateral sides of the battery tray.

In one aspect, a plurality of laterally extending walls extends between the first and second sidewalls of the battery tray.

In one aspect, the component includes a top portion and a bottom portion of the battery tray, wherein the top portion is mounted to an upper exterior surface of the first and second sidewalls in the second state and the bottom portion is mounted to a lower exterior surface of the first and second sidewalls in the second state.

In one aspect, the extrusion defines an exterior surface, and the exterior surface includes a plurality of integral surface features projecting therefrom.

In one aspect, the surface features are disposed at distinct locations along the length of the extrusion and do not project along the entire length of the extrusion.

In one aspect, the component includes a top portion and a bottom portion of the battery tray, wherein flange portions of the top portion and the bottom portion are mounted together to define a combined flange, and an upper exterior surface of the first and second extrusions is mounted to a lower surface of the combined flange, wherein the first and second sidewalls are defined by a combination of the first and second extrusions and the upper and lower portions, wherein an interior cavity of the battery tray is defined by the upper and lower portions.

In one aspect, an inner surface of the first and second extrusions define a portion of an interior cavity of the battery tray.

In another aspect, a method of forming a structural component for a vehicle is provided. The method includes extruding a material and defining an extrusion in a first state having a cross-section with a plurality of wall portions, internal cells defined by the wall portions, and a plurality of exterior surfaces; placing the extrusion within a die, wherein the extrusion has a size and shape that is reduced relative to a shape of the die; providing pressurized water to a first set of the internal cells; expanding the wall portions surrounding the first set of internal cells into engagement with an internal surface of the die; and in response to expanding the wall portions, defining a second state of the extrusion, wherein the second state has a larger cross-sectional size and shape than the first state.

In one aspect, the die includes a first portion and a second portion that, when combined, define an internal cavity, wherein the internal cavity defines an open space adjacent the first set of internal cells, and the first set of internal cells expand into the open space in response providing the pressurized water, and wherein the internal cavity defines an abutment portion corresponding to a portion of the extrusion prior to expanding the wall portion, such that the extrusion does not expand against the abutment portion.

In one aspect, the first set of cells receive water therein and a second set of cells do not receive water therein.

In one aspect, the die defines a recessed area defining a shape of a raised surface feature, wherein a raised surface feature is defined on an exterior surface of the extrusion in response to expanding the wall portions.

In one aspect, an open space is defined around substantially the entire perimeter of the extrusion and the extrusion expands in all directions into engagement with the internal surface of the die.

In one aspect, the extrusion defines a stepped shape, and an upper exterior surface of the stepped shape expands in response to providing the pressurized water.

In one aspect, the structural component is a battery tray having an upper portion and a lower portion that define at least a portion of an internal cavity, wherein the upper portion and the portion of the battery tray are sealed with the extrusion, wherein the extrusion provides support for the upper portion and the lower portion.

In one aspect, the upper portion and the lower portion are sealed together to define a combined flange, and the extrusion is mounted to the combined flange.

In one aspect, the upper portion is sealed to an upper surface of the extrusion and the lower portion is sealed to a lower surface of the extrusion.

BRIEF DESCRIPTION OF THE DRAWINGS

Other advantages of the present invention will be readily appreciated, as the same becomes better understood by reference to the following detailed description when considered in connection with the accompanying drawings wherein.

DETAILED DESCRIPTION OF THE PREFERRED EMBODIMENTS

Figure 1A:
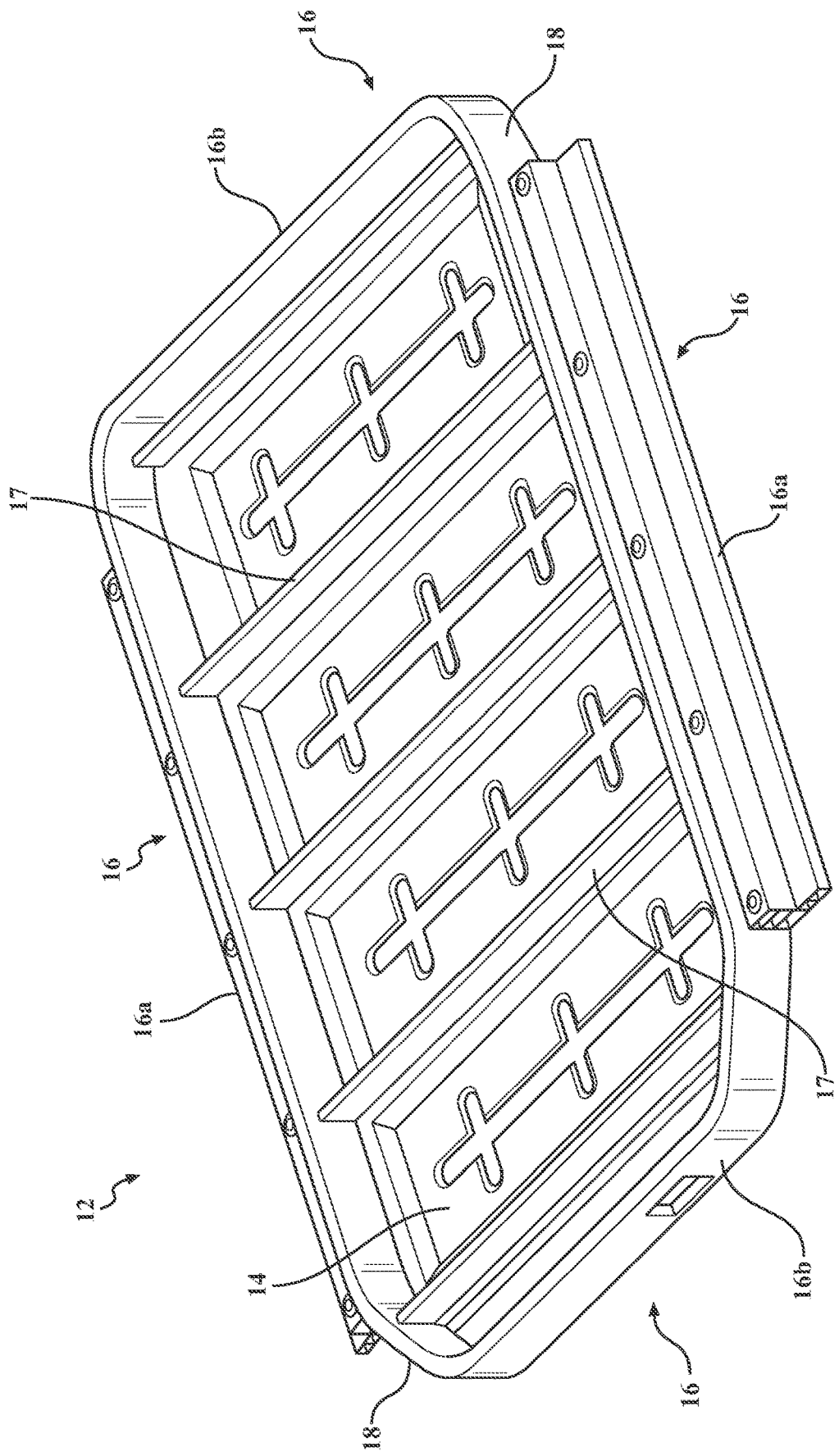
FIG. 1A is a perspective view of a vehicle structural component, and in particular a battery frame structure.

With reference to FIG. 1A, a vehicle structural component in the form of a battery frame 12 is shown. The frame 12 is in the form of a tray and includes a generally flat base 14 on which batteries (not shown) may be mounted or attached to the frame 12. The frame 12 further includes a plurality of side walls 16 disposed at the perimeter of the base 14, thereby defining an interior recess or the like in which the batteries may be placed. The frame 12 may further include a plurality of laterally extending walls 17 extending between opposing side walls 16, defining a plurality of spaces in which the batteries may be placed. As described in further detail below, various portions of the frame 12 may be defined by hydroforming portions of an extrusion 20 to create tight tolerances to assist in sealing and/or assembly of components.

The battery frame 12 may be configured to be attached to further vehicle structure (not shown). In some instances, the battery frame 12 is attached to further components in a generally sealed manner. Accordingly, tight tolerances may be necessary at some regions of the battery frame 12 to ensure a proper seal may be achieved to prevent water or other debris from entering the interior of the battery frame 12 and making contact with the batteries. In another aspect, the battery frame 12 may include specific body mount areas requiring tight tolerances.

The battery frame 12 may be constructed in variety of ways, as further described below. In one aspect, shown in FIGS. 1B-1C, a bottom portion 12a may be enclosed by a top portion 12b, defining a cavity therein, and defining a flange portion 12c where the top portion 12b and bottom portion 12a overlap. An extrusion 20, further described below, may provide structural support as part of the overall battery frame 12, and the top and bottom portions 12a, 12b may be mounted to an upper exterior surface of the extrusion 20.

Figure 1B:
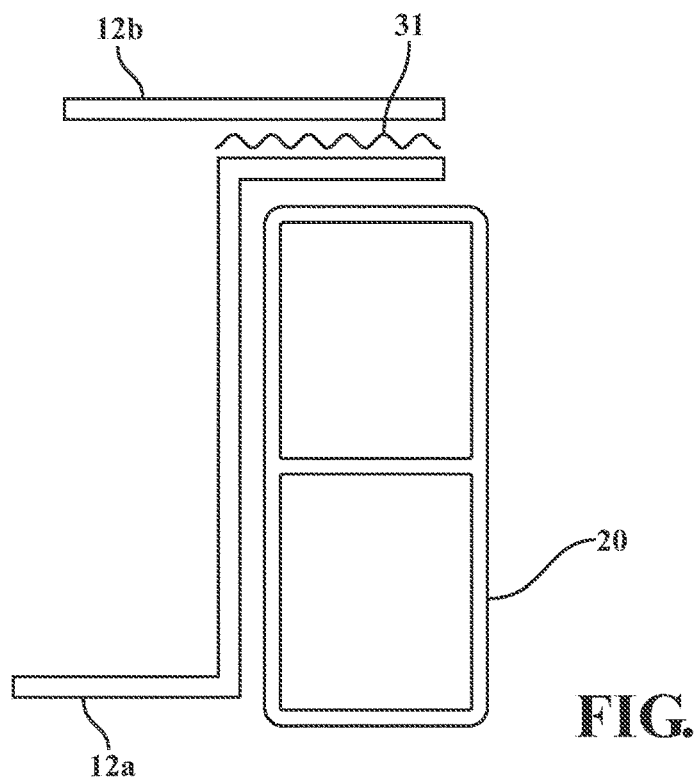
FIGS. 1B and 1C are schematic cross-sectional views of a wall portion of the frame, illustrating an extrusion acting as a support structure for a sealed interface defined by an upper and lower portion of the frame.
Figure 1C:
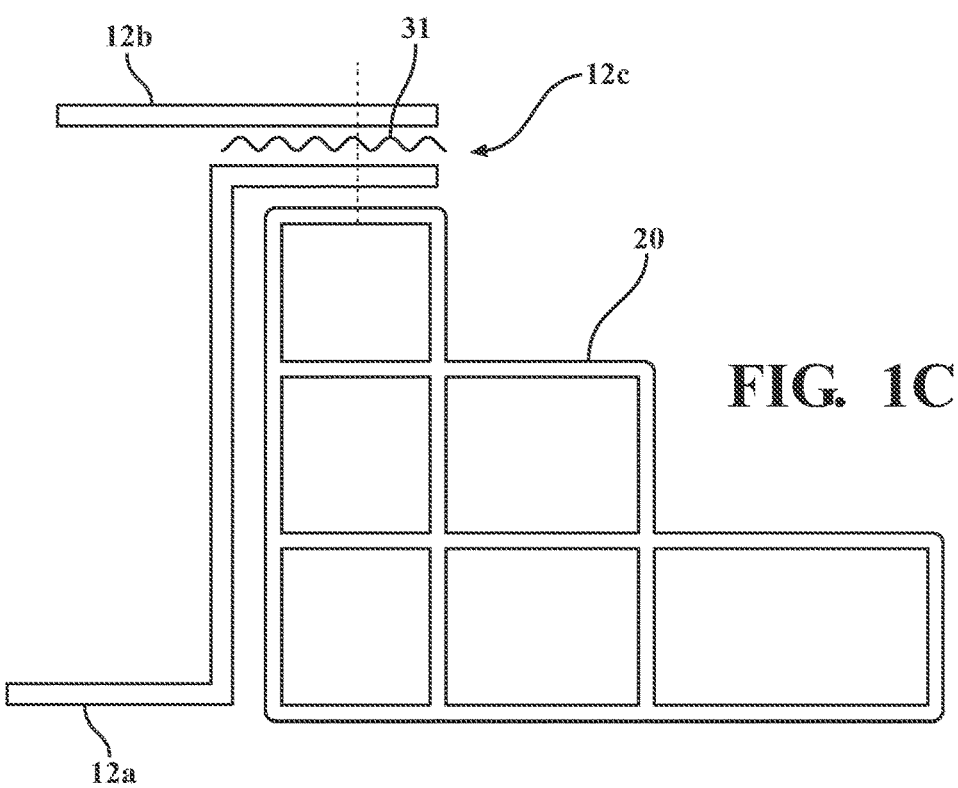
Figure 1D:
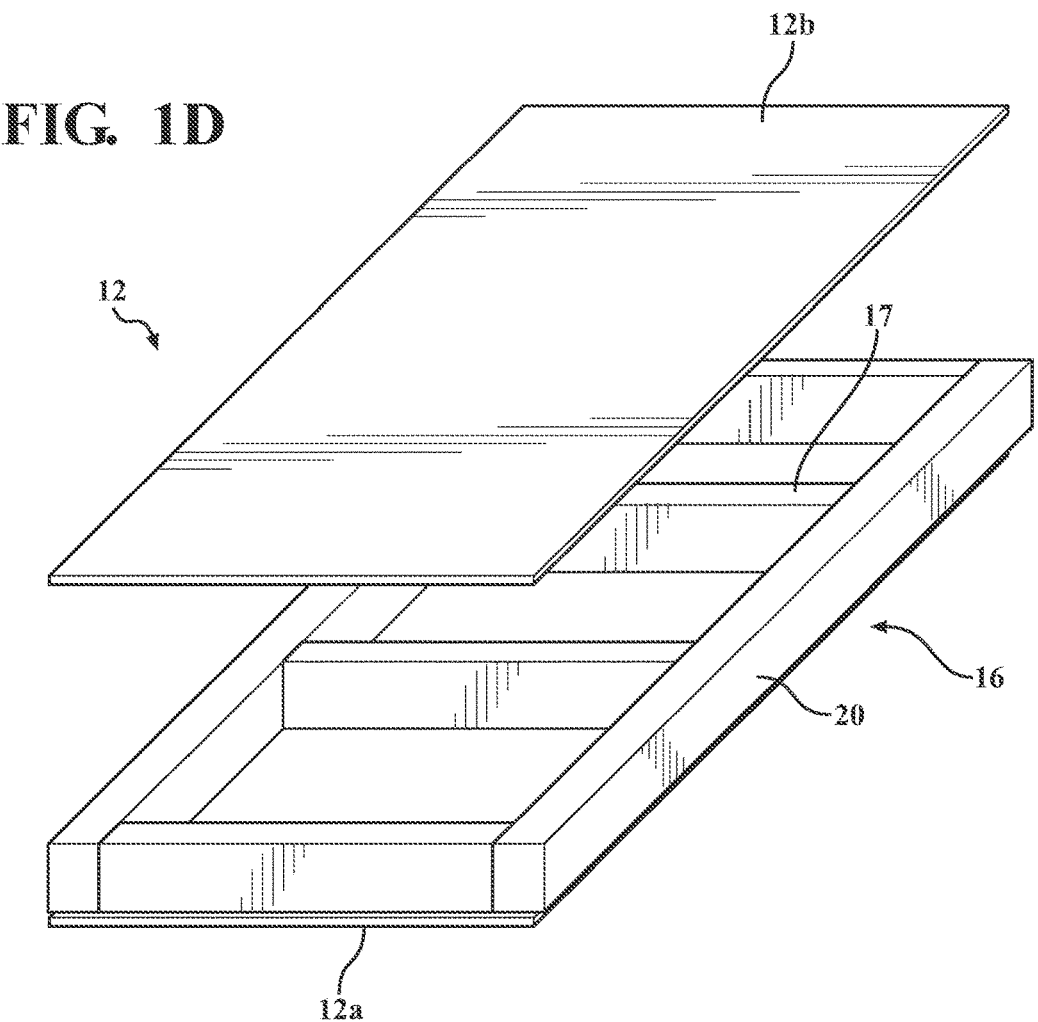
FIG. 1D illustrates a schematic perspective view of another embodiment of a battery frame structure.
Figure 1E:
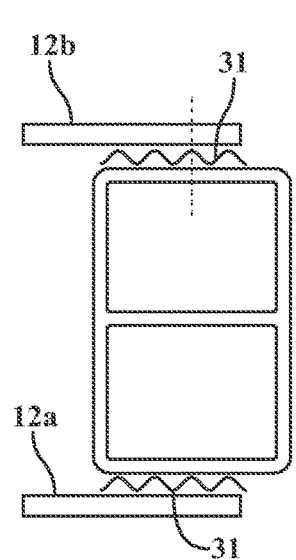
FIGS. 1E and 1F are schematic cross-sectional views of a wall portion of the frame, illustrating an extrusion providing a sealed interface with the upper and lower portions of the frame, in which the extrusion combines with the upper and lower portions to define an internal cavity.
Figure 1F:
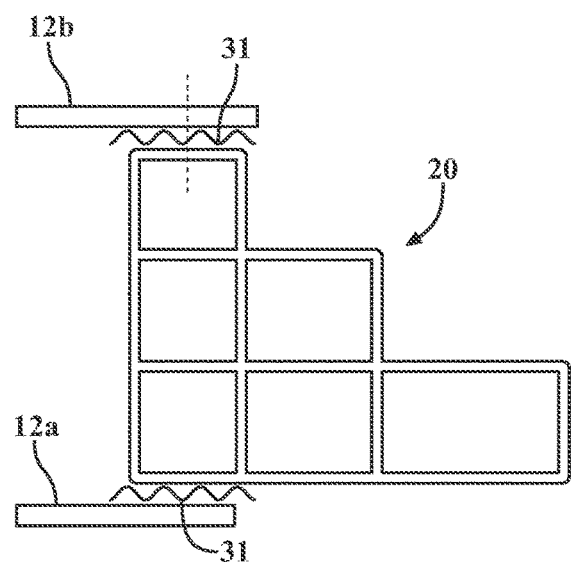

In another aspect, shown in FIGS. 1D-1F, an exterior surface of the extrusion 20 may partially define the interior cavity of the battery frame 12, with the top portion 12b mounted to an upper exterior surface of the extrusion 20 and the bottom portion 12a mounted to a lower exterior surface of the extrusion 20. In this aspect, the extrusion 20 spans between the top and bottom portions 12a, 12b, rather than the top and bottom portions 12a, 12b being joined together directly to a define a mounting flange, as in the prior described aspect.

Accordingly, the extrusion 20 may function as a support surface for a sealant joint or pre-sealed interface. The extrusion 20 may be incorporated directly as part of the sealed surface/sealant joint (FIGS. 1D-1F), or it may be a support for another pre-sealed surface (FIGS. 1B and 1C).

FIGS. 1B and 1C illustrate an example where the extrusion 20 acts as a support structure, but the sealed cavity is defined by the portions 12a and 12b. However, the joining of the three components 12a, 12b, and 20 (via fastener, rivet, or mechanical joint) may be subject to tolerances, and in this case, the tolerances of the extrusion will affect the seal between the portions 12a, 12b. The extrusion 20 in this case does not form a part of the enclosure or cavity, but it will affect the sealing capability of the two portions 12a, 12b, primarily due to the stiffness of the extrusion 20 compared to the portions 12a, 12b.

In FIGS. 1B and 1C, the sealant may be disposed between the portions. In FIGS. 1D-1F, the sealant may be disposed between the bottom portion 12a and a bottom surface of the extrusion 20, and between a top surface of the extrusion 20 and the top portion 12b.

The top and bottom portions 12a, 12b are illustrated schematically in the Figures as generally flat sheets or trays with flat walls. It will be appreciated that the top and bottom portions 12, 12b may have various shapes and are not necessarily flat. They may be metal stampings, molded plastics/composites, cast parts, or a combination of each.

FIG. 1A illustrates one example of the battery frame 12 and excludes the top portion 12b from the view. It will be appreciated that the top portion 12b would be placed over the illustrated frame 12, as illustrated in the cross-sections of FIGS. 1B and 1C. FIG. 1D illustrates the top portion 12b disposed above the remainder of the frame 12 in an exploded view. It will be appreciated that the top portion 12a is in contact with the remainder of the frame 12 when installed and sealed, as shown in FIGS. 1E and 1F.

In one aspect, not all regions of the battery frame 12 may have tight tolerances. Accordingly, the battery frame 12 may be defined by multiple portions that are joined together or otherwise attached. In one aspect, the plurality of side walls 16 may include first side walls 16a that are on opposite sides of the battery frame 12, and may further include second side walls 16b on other opposite sides of the battery frame 12. Corner portions 18 may be disposed that connect the plurality of side walls 16 to define the perimeter. The plurality of side walls 16 may have a generally straight form, with the corner portions 18 having a bent shape. For the purposes of discussion, reference to the side walls 16 will refer to the straight portions.

In one aspect, the plurality of side walls 16 may be formed through a combination of extrusion and hydroforming. Extrusion generally involves the creation of parts or components that have a generally constant cross-sectional profile. Typically, a die is used that defines the shape of the cross-section, and the material of the component is pushed through the die and creates an elongated shape with a constant cross-section. A similar process to extrusion is drawing, in which material is pulled through a die, creating an elongate part having a generally constant cross-section. Extrusions can be used to create complex cross-sections, including cavities or other similar structure. Due to the constant cross-section created by extrusion, distinct features, such as raised portions or indentations on the elongate surface cannot be formed.

Figure 2:
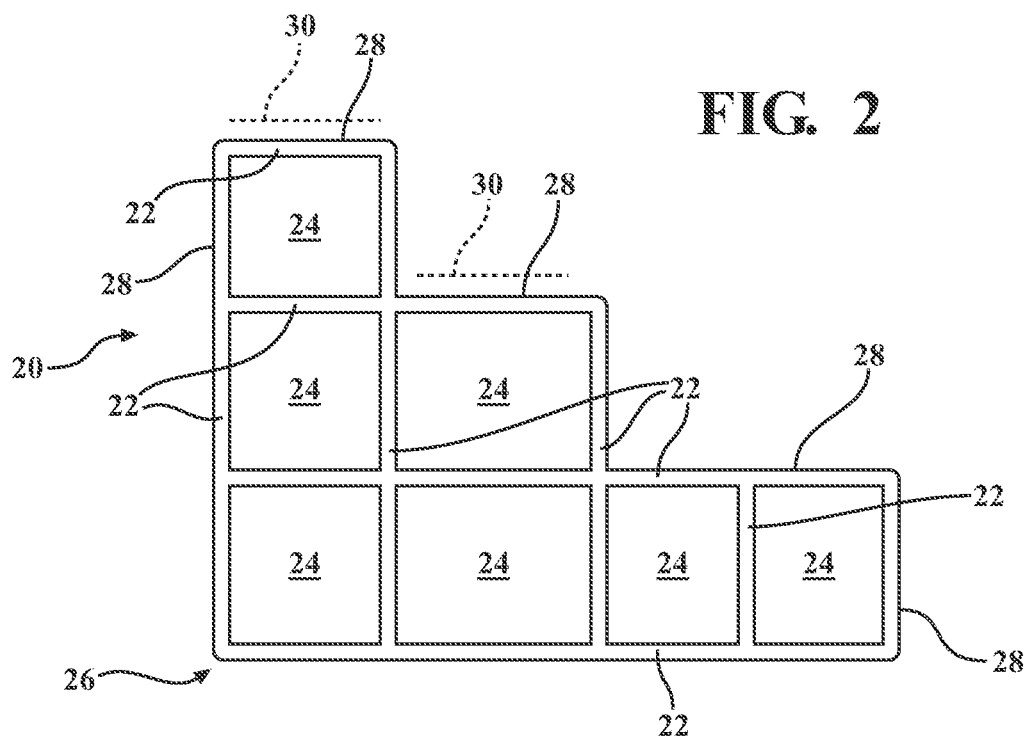
FIG. 2 is a cross-sectional view of an extruded section of the battery frame structure prior to hydroforming.

In one aspect, the side walls 16 may be made from aluminum, and may initially be in the form of an extrusion 20 with a constant cross-section. One example extrusion 20 is shown in FIG. 2. The extrusion 20 may be considered to be a first condition of the side wall 16. One example of the extrusion 20 is shown in FIG. 2. FIG. 2 illustrates the extrusion 20 for use as one of the side walls 16. The extrusion 20 may be provided following an extrusion process in the first condition, and may be further processed via hydroforming, as further described below. Of course, as described above, the extrusion 20 may also provide support for a battery frame 12 that already defines a sidewall.

Extrusions 20 may also be used for the laterally extending walls 17. While some of the laterally extending walls 17 may not be used along a sealing surface, these laterally extending walls 17 may still require a tight tolerance requirement, and the use of local features with tight tolerances formed in the manner described herein may provide additional advantages in assembly and functionality. It will be further appreciated that other structures may be defined as described herein in the form of extrusions and hydroforming.

Hydroforming is a manufacturing process that uses water under pressure to shape a component relative to a die. Hydroforming may be used as an alternative to stamp forming processes, and can be used for the shaping of sheet-like structures. For example, a sheet of material may be placed over the surface of a die, and water may be introduced into the die under pressure to a surface of the sheet, thereby forcing the sheet of material against the die and shaping the sheet to conform to the shape of the die.

In one aspect, the extrusion 20, which may be a first state of the side wall 16 prior to hydroforming, may be placed within a die 32 (FIG. 3) for a subsequent hydroforming operation. In one aspect, the extrusion may have a step-shaped cross-sectional shape, as shown in FIG. 2. The extrusion 20 may include a plurality of intersecting walls 22 that combine to define a plurality of cells 24, which may be in the form of extended cavities. The plurality of walls 22 may further combine to define an outer perimeter 26 of the cross-section.

The outer perimeter 26 of the cross-section may include a plurality of exterior portions 28. The exterior portions 28 may be considered the portions that are viewable from outside of the extrusion 20. The exterior portions 28 may be the portions that interface with other adjacent components of the battery frame 12 or adjacent structural components of the vehicle.

In one aspect, certain ones of the exterior portions 28 may be portions where tight tolerances must be met and where specific surface features may be provided for interfacing with adjacent structure. For example, such portions, which may be referred to as target portions 30, may be body mount portions or seal surfaces. Accordingly, these target portions 30 may be further processed specifically via hydroforming to achieve the specific shape that meets the desired tight tolerance. These target portions 30 may be used as the support surface and incorporated directly as part of the sealed surface or sealant joint, or the target portions 30 may be used as support for another pre-sealed surface (such as the flange 12c described above).

Even when the extrusion 20 and target surfaces 30 are used as support surfaces for pre-sealed surfaces, tight tolerances are desirable, because tolerances of the extrusion will affect the seal between the sealed upper and lower portions 12a, 12b. Generally, the stiffness of the extrusion 20 is greater than the stiffness of the material of the upper and lower portions 12, 12b. Typically, a sealant material 31 (shown schematically in FIGS. 1B, 1C) is disposed between the upper and lower portions 12a, 12b when they are sealed together. The sealant may be a rubber strip, adhesive, polymer strip, etc. The sealed interface may be bolted, riveted, or otherwise mechanically secured to the extrusion 20.

Figure 3:
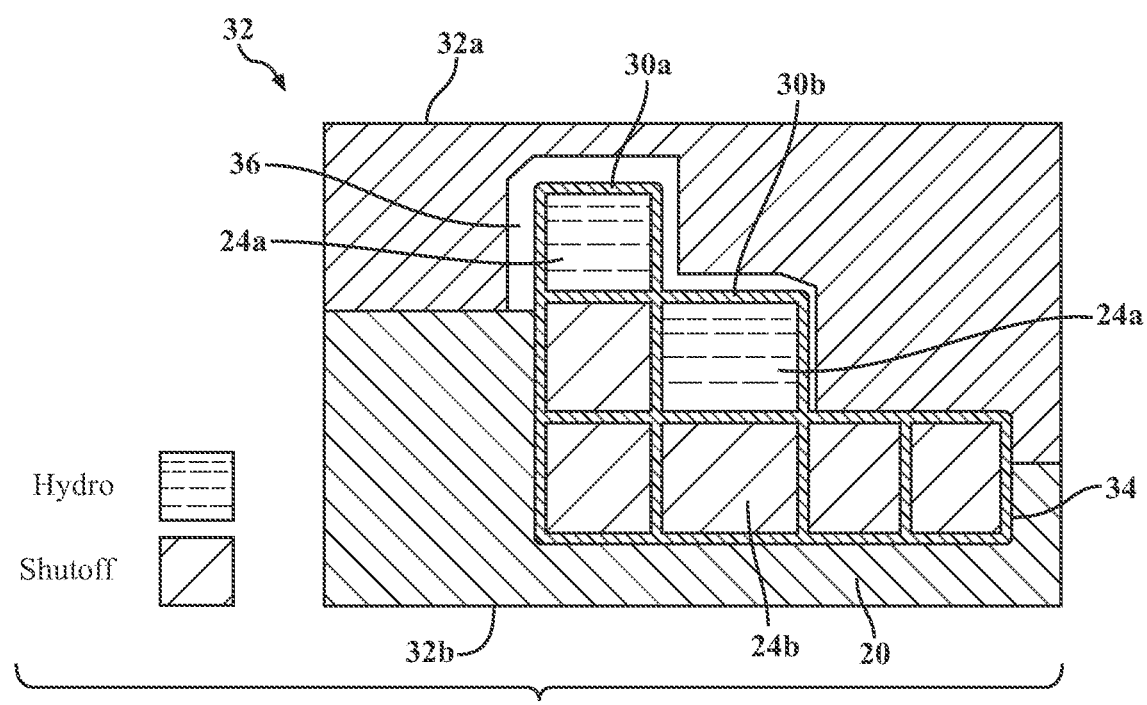
FIG. 3 is a cross-section view of the extruded section disposed within a die prior to hydroforming.

As shown in FIG. 3, the extrusion 20 includes a pair of target portions 30a and 30b in one aspect. These two target portions 30a, 30b are the portions that may undergo hydroforming in this example.

As shown in FIG. 3, the extrusion 20 may be placed within the die 32. The die 32 may be in a two-piece form, with an upper portion 32a and a lower portion 32b. The lower portion 32b may be sized and arranged to securely hold the bottom of the extrusion in a recess 34 of the lower portion 32b. The lower portion 32b may include an abutment portion and may be further be arranged to abut at least a portion of the sides of the extrusion 20.

The upper portion 32a may also include a recess 36. The recess 36 may be shaped to be similar to the shape of the extrusion 20, such that the recess 36 appears to have a stepped shape in this example. However, the recess 36 may be sized to leave an open space between the extrusion 20 and the upper portion 32*a* of the die 32. The open space between the extrusion 20 and the upper portion 32*b* allows adjacent portions of the extrusion 20 to expand into the space when undergoing the hydroforming operation. Accordingly, the shape of the extrusion 20 may be modified to conform to the shape of the die 32. Thus, the die 32 may be shaped to include the negative of the surface features to be created by the hydroforming, thereby causing the constant cross-section of the extrusion 20 to be modified in accordance with the shape of the die 32. It will be appreciated that the lower portion 32*b* may also include recesses to allow for the creation of similar surface features for cells that receive pressurized water.

With reference to FIG. 3, certain ones of the cells 24 may be hydro cells 24*a*, and other ones of the cells may be shutoff cells 24*b*. The hydro cells 24*a* may be the cells defined, at least in part, by the target surfaces 30. The shutoff cells 24*b* may be the cells 24 defined by non-target portions of the extrusion 20. In the hydro cells 24*a*, water is introduced or fed under high pressure in the cells 24, causing these cells 24 to expand into engagement with the upper portion 32*a* of the die 32 to modify the shape of the extrusion 20 and to meet the tight tolerance desired. The shutoff cells 24*b* may not be exposed to water under pressure. However, in some cases, the shutoff cells 24*b* may be opened partially or fully to equalize pressure. Alternatively, the shutoff cells 24*b* may be plugged, such as a simple plug or through the introduction of an elongate die or other insertable member that prohibits expansion into the shutoff cells 24*b* and helps maintain the pressure in adjacent hydro cells 24*a*.

Figure 4:
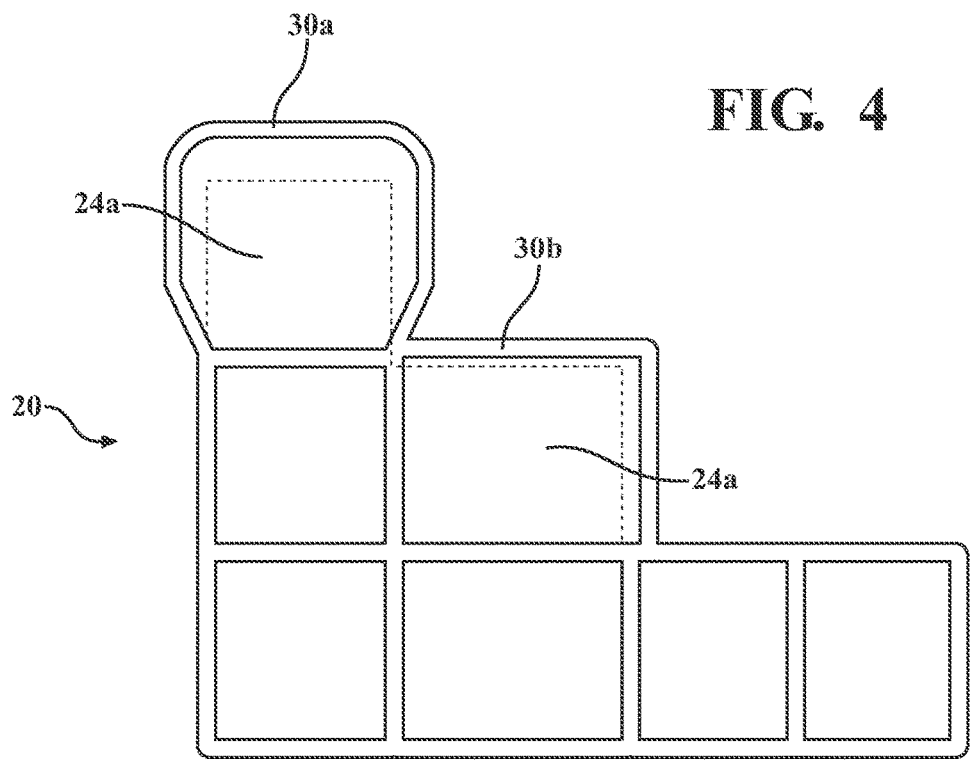
FIG. 4 is a cross-sectional view of the extruded section after hydroforming and removed from the die.

FIG. 4 illustrates an example of the extrusion 20 of FIG. 3 after the hydroforming has been completed. As shown, the areas of the extrusion 20 surrounding the hydro cells 24*a* are expanded and larger relative to the pre-hydroformed shape and state shown in FIGS. 2 and 3.

The above described example of the extrusion 20 may be considered to be partially downsized relative to the desired final shape of the side wall 16, such that the extrusion 20 may expand from its downsized version into the desired final size and shape. The above described example of the extrusion 20 is not downsized at all portions of the cross-section, such that the bottom portion may fit securely within the bottom portion 30*b* of the die with little to no space between exterior surfaces and the surfaces of the die 32.

Figure 5:
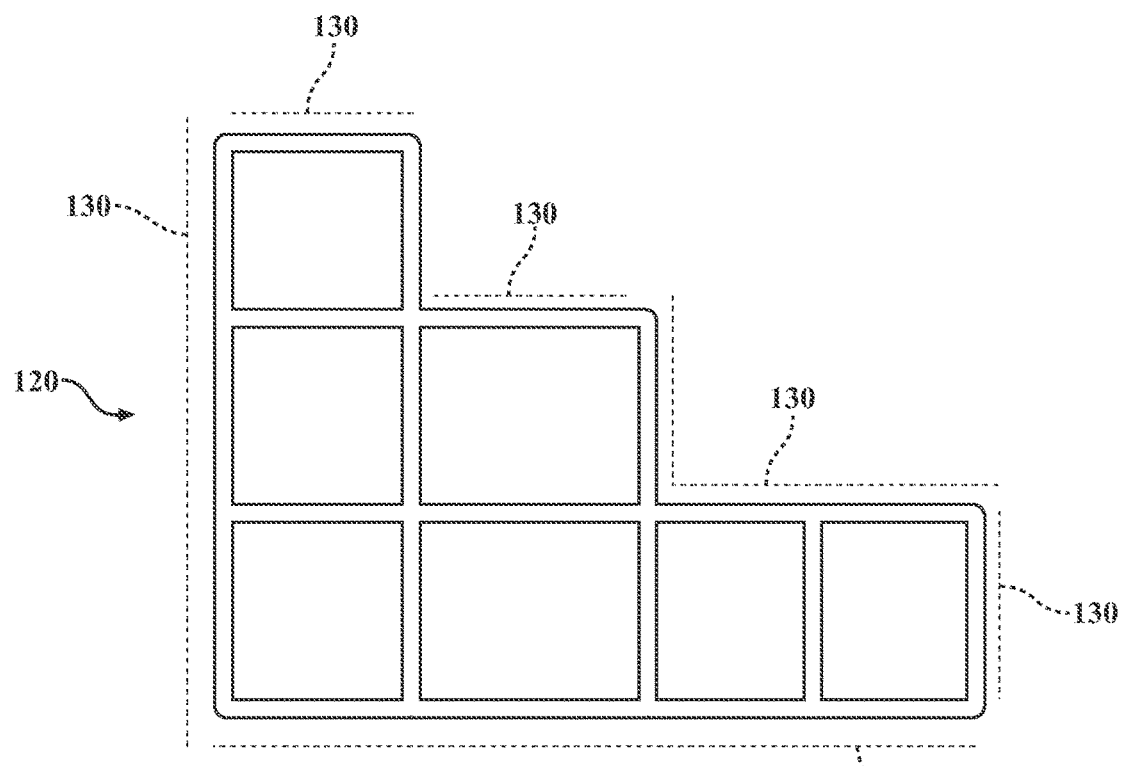
FIG. 5 is a cross-sectional view of another extruded section before hydroforming.

With reference to FIG. 5, in another aspect, an extrusion 120 may be further downsized. In one aspect, the extrusion 120 may be considered entirely or fully downsized, in which the extrusion 120 is designed to expand in all directions. Accordingly, the extrusion 120 may include target portions 130 extending around substantially the entire perimeter of the cross-section of the extrusion 120.

Figure 6:
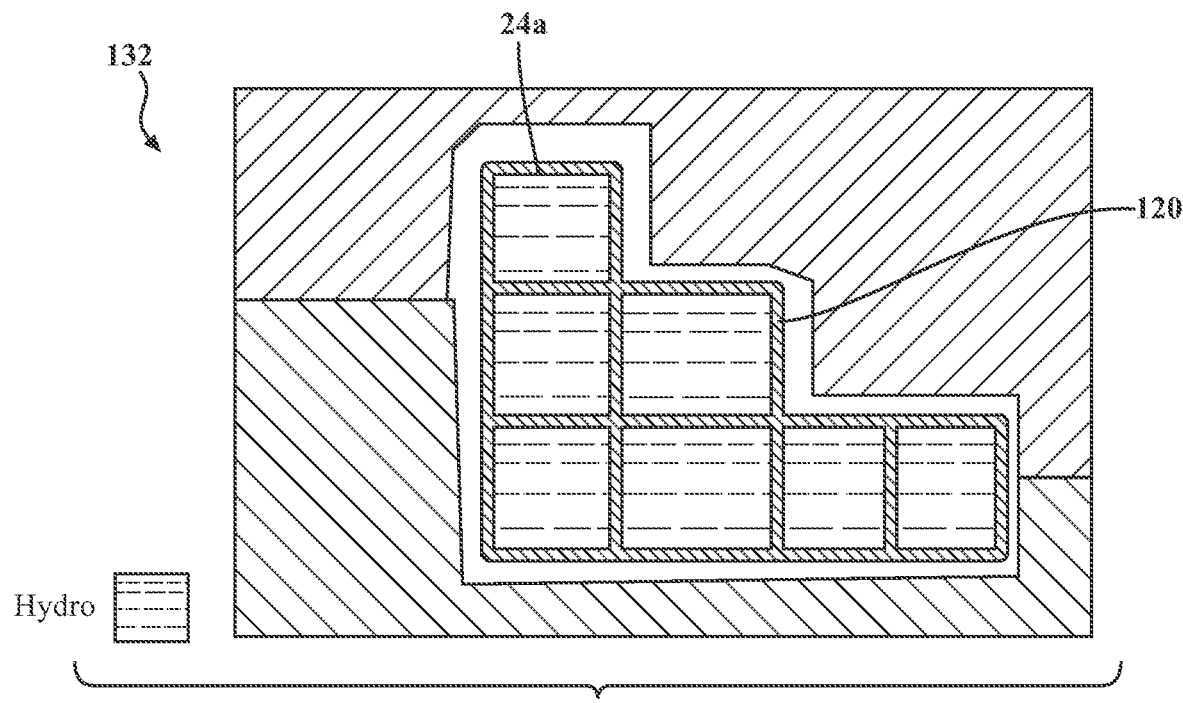
FIG. 6 is a cross-sectional view of the extruded section of FIG. 5 disposed within another die.
Figure 7:
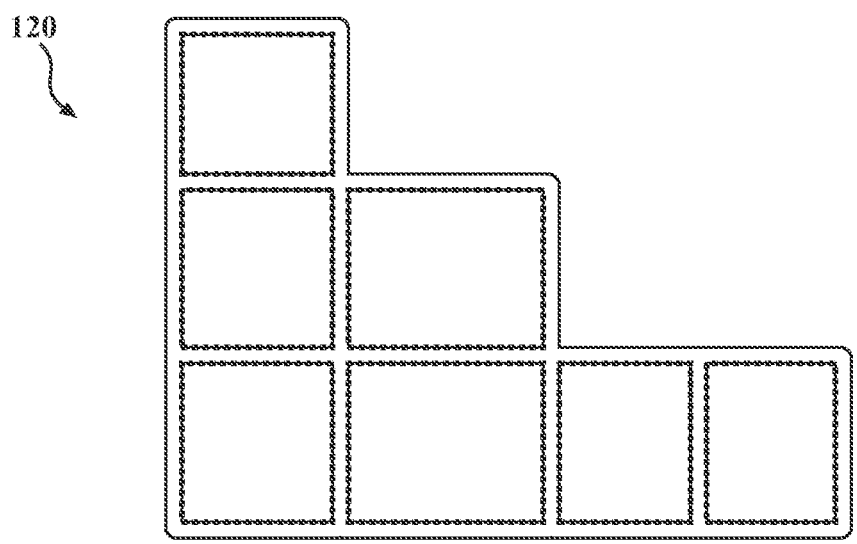
FIG. 7 is a cross-sectional view of the extruded section of FIGS. 5 and 6 after hydroforming.

With reference to FIG. 6, as with the previous example, a die 132 may be sized to match the desired final dimensions of the side wall 16. Thus, with the fully downsized extrusion 120 disposed in the die 132, there may be empty space on all sides of the extrusion 120. In this aspect, each of the cells 24 may be hydro cells 24*a*. In this aspect, each of the cells 24 may then be subject to the introduction of pressurized water, causing each of the cells 24 to expand outward and causing the extrusion 120 to expand into engagement with the surfaces of the die 132. The extrusion 120 will accordingly have an overall final shape that matches the contour of the die 132 to define various external features and meet tight tolerances for areas such as body mount regions and seal surfaces. The final, post-hydroformed shape of the extrusion 120 will be larger than the pre-hydroformed shape of the extrusion 120. FIG. 7 illustrates the extrusion 120 in a post-hydroformed state.

It will be appreciated that various cross-sectional shapes of an extrusion may be provided after extrusion and prior to hydroforming. Accordingly, the present disclosure shall not be limited to the "stepped" shape shown herein. For example, an extrusion with a single hollow cavity or cell may be used and placed within a die having corresponding shape that is slightly larger than the size of the extrusion prior to hydroforming. Alternatively, a rectangular shaped cross-section with a single row of multiple cells may be used. Alternatively, a generally square shape with multiple cells may be used. Various other shapes and arrangements of cells may be used to define the general overall shape of the desired structural component. The cells adjacent the location of a desired body mount location or seal surface may then be subjected to introduction of pressurized water with other cells being plugged or otherwise not subjected to pressurized water.

Figure 8:
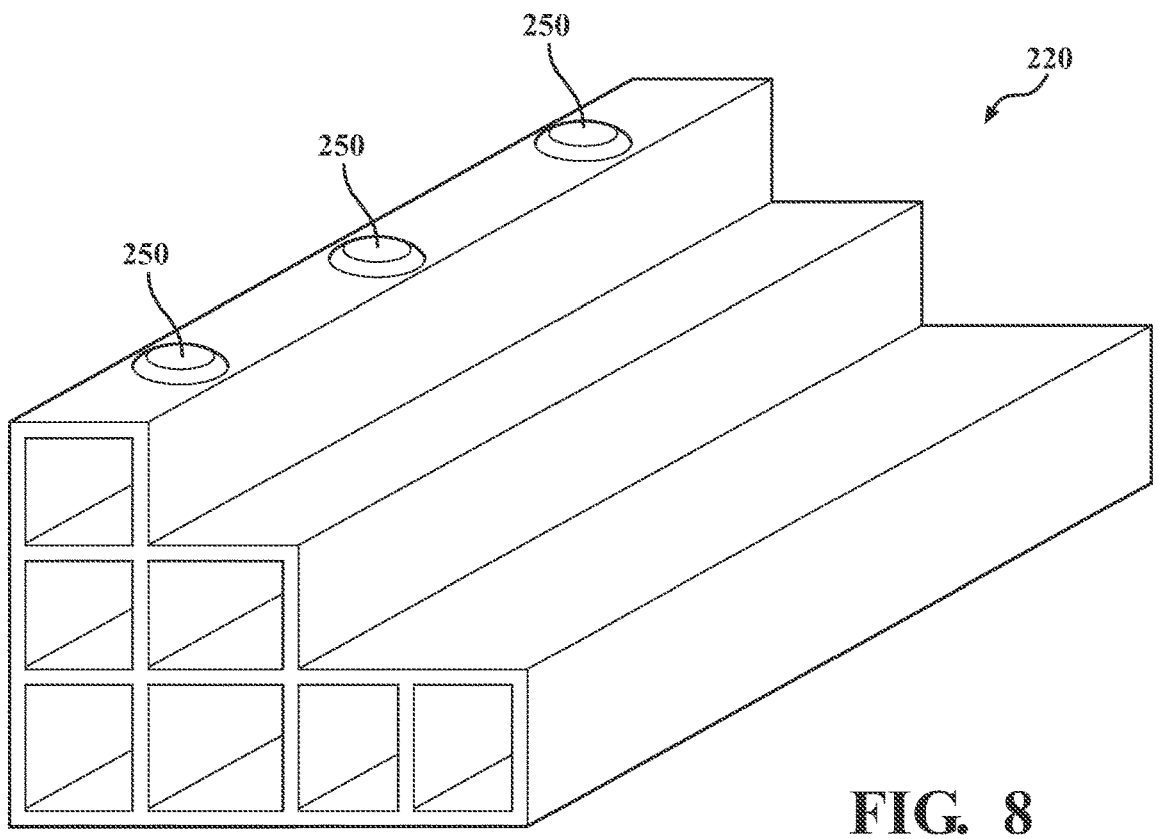
FIG. 8 is a perspective view of an extrusion illustrating local features formed by hydroforming.

As described above, the hydroforming process used on an extrusion, such as extrusion 20 or 120 or other examples, may be used to create surface features based on the shape of the die (such as die 32 or 132 or other examples). Such surface features may be created on exterior surface portion of an extrusion. With reference to FIG. 8, one example of an extrusion 220 having local surface features 250 is shown. In the example of FIG. 8, the extrusion 220 is shown having three surface features 250 at three distinct locations on an upper surface of "step-shaped" extrusion 220. Of course, it will be appreciated that these surface features 250 could be spaced apart differently, be of a different quantity, have a different shape, and/or be located on other exterior surfaces of the extrusion 220.

As shown, the surface features 250 have a generally circular shape. The surface features 250 may be considered in this example to be a round embossment. In another aspect, the surface features 250 may have a square or hex shape, for example. Other shapes may also be used. Generally speaking, almost any raised feature may be created on the extrusion 220 (or other example extrusions) by hydroforming the extrusion 220 within a die (not shown in this example). The die may include a recessed area defining the shape of the raised surface feature.

Figure 9:
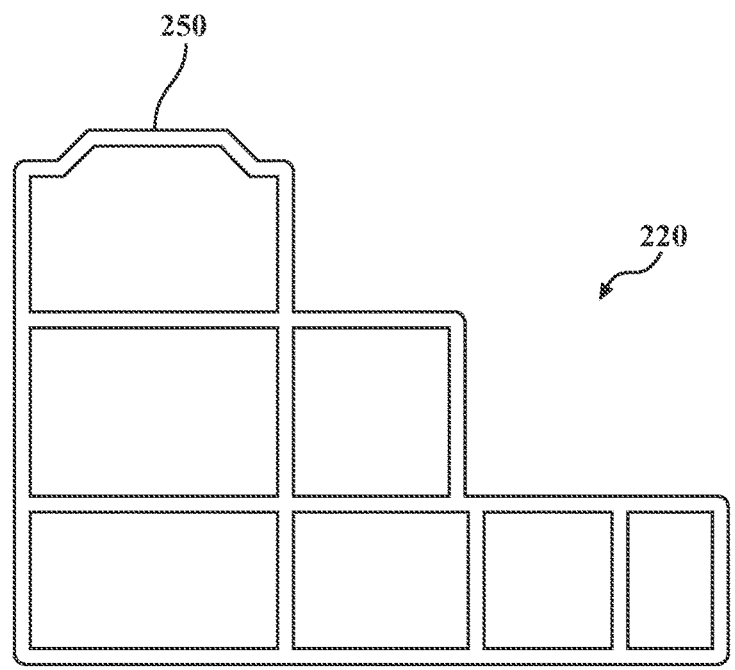
FIG. 9 is a cross-sectional view of the extrusion of FIG. 8 after hydroforming.

FIG. 9 illustrates a cross-section of the extrusion 220 after hydroforming has been performed on the extrusion 220 within the corresponding die. The surface feature 250 is shown projecting upward from an upper surface of the extrusion 220. This surface feature 250 does not project along the entire length of the extrusion 220, but is located at distinct locations corresponding to the shape of the die.

However, it will be appreciated that a surface feature may be created along the entire length to create a surface or portion of the extrusion 220 with a tight tolerance as a result of hydroforming.

It will be appreciated that multiple shapes and sizes of surface features may be included on the same part. For example, some of the features may be round, with others being box-shaped or hex-shaped or other shapes. Additionally, the surface features 250 may project at different heights, and may be disposed on multiple different surfaces of the extrusion 220.

Figure 10:
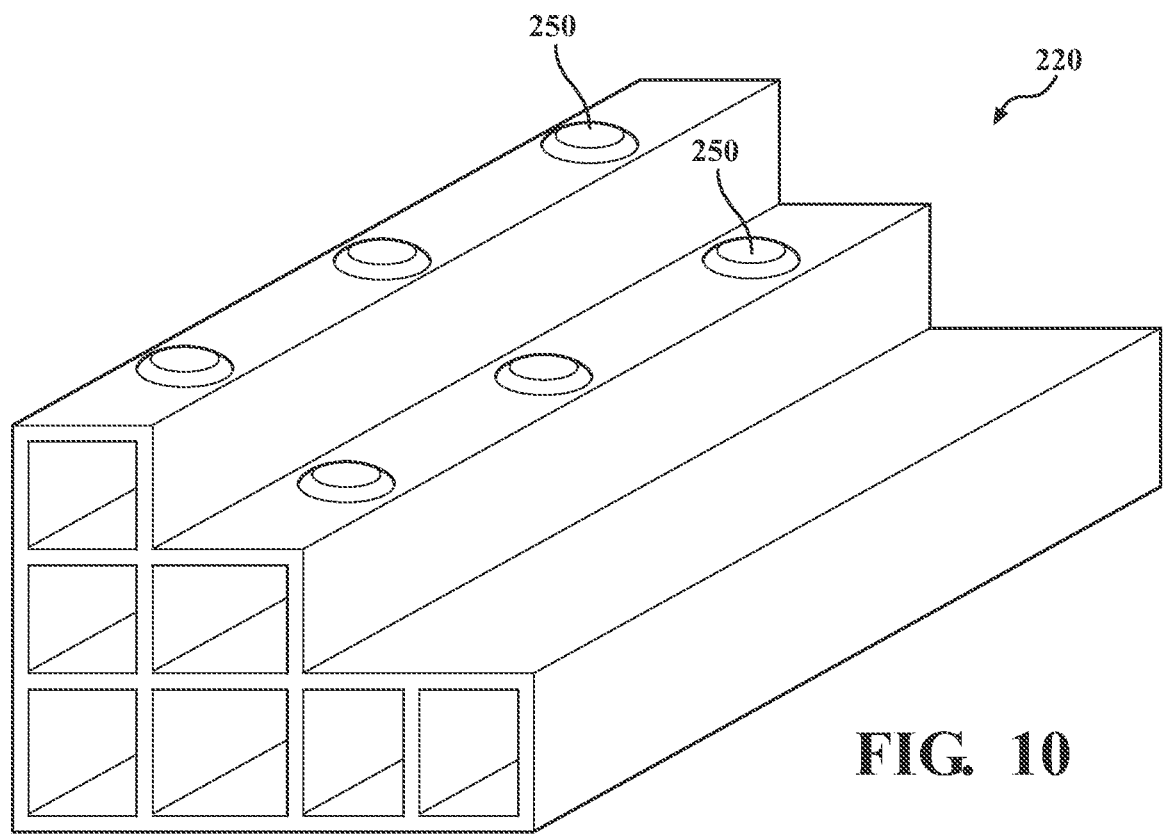
FIGS. 10 and 11 are further views illustrating local features formed by hydroforming on additional exterior surfaces of the extrusion.
Figure 11:
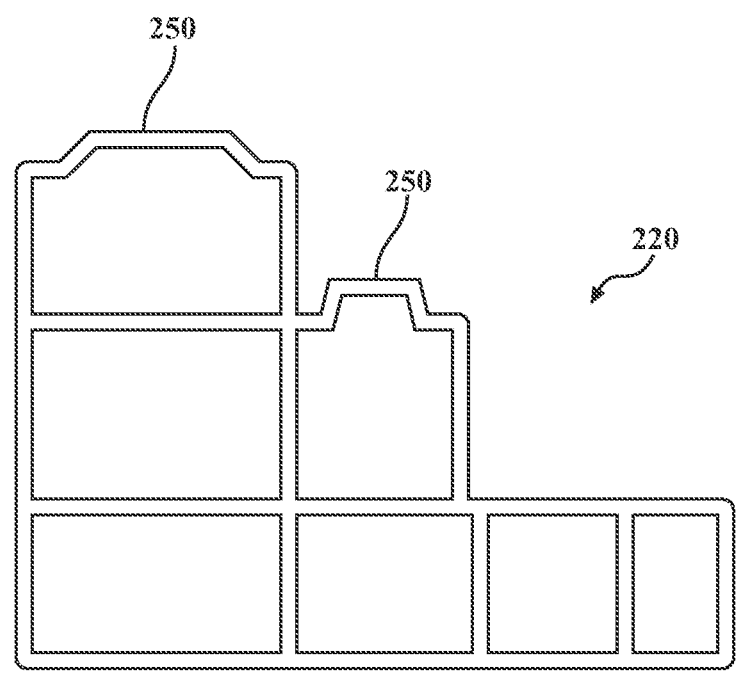

For example, FIGS. 10 and 11 illustrate surface features 250 disposed on additional exterior surfaces of the extrusion 220. It will be appreciated that the surface features 250 may be disposed on any exterior surface of the extrusion 220 in a manner described above, and for various types of cross-sectional overall shapes of the extrusion 220.

The above description has been made with respect to a portion of the battery tray 12 shown in FIGS. 1A and 1D. However, it will be appreciated that various aspects of this disclosure may be applied to other vehicle structural components and/or portions thereof, and that the disclosure is not limited to battery trays. In view of the disclosure, any similarly extruded component may be extruded in partially or fully reduced cross-section, and pressurized water may be introduced to an internal cavity of the cross-section to expand the material into engagement with a die having a relatively larger shape than the initially extruded cross-section. Accordingly, various surface features or other features may be created and tight tolerances may be achieved by the above described combination of extrusion and hydroforming.

Obviously, many modifications and variations of the present invention are possible in light of the above teachings and may be practiced otherwise than as specifically described while within the scope of the appended claims. These antecedent recitations should be interpreted to cover any combination in which the inventive novelty exercises its utility.

What is claimed is:

1. A structural component for a vehicle, the structural component comprising:
   at least one extrusion extending along a length thereof, the at least one extrusion defining a cross-sectional shape;
   a plurality of intersecting wall portions of the at least one extrusion;
   a plurality of internal cells defined by the plurality of wall portions, the cells extending along the length of the at least one extrusion;
   a plurality of exterior surface portions of the extrusion;
   wherein the at least one extrusion has a first state having a first cross-sectional size and shape;
   wherein the at least one extrusion has a second state, wherein the cross-sectional size and shape is expanded relative to the cross-section of the at least one extrusion in the first state.

2. The structural component of claim 1, wherein the structural component is a battery tray, wherein the at least one extrusion comprises a first extrusion and a second extrusion, wherein the first and second extrusion define, at least in part, first and second sidewalls of the battery tray, wherein the first and second sidewalls are on opposing lateral sides of the battery tray.

3. The structural component of claim 2, further comprising a plurality of laterally extending walls extending between the first and second sidewalls of the battery tray.

4. The structural component of claim 2, further comprising a top portion and a bottom portion of the battery tray, wherein the top portion is mounted to an upper exterior surface of the first and second sidewalls in the second state and the bottom portion is mounted to a lower exterior surface of the first and second sidewalls in the second state.

5. The structural component of claim 1, wherein the extrusion defines an exterior surface, and the exterior surface includes a plurality of integral surface features projecting therefrom.

6. The structural component of claim 5, wherein the surface features are disposed at distinct locations along the length of the extrusion and do not project along the entire length of the extrusion.

7. The structural component of claim 2, further comprising a top portion and a bottom portion of the battery tray, wherein flange portions of the top portion and the bottom portion are mounted together to define a combined flange, and an upper exterior surface of the first and second extrusions is mounted to a lower surface of the combined flange, wherein the first and second sidewalls are defined by a combination of the first and second extrusions and the top and bottom portions, wherein an interior cavity of the battery tray is defined by the top and bottom portions.

8. The structural component of claim 2, wherein an inner surface of the first and second extrusions define a portion of an interior cavity of the battery tray.

9. A method of forming a structural component for a vehicle, the method comprising:
   extruding a material and defining an extrusion in a first state having a cross-section with a plurality of wall portions, internal cells defined by the wall portions, and a plurality of exterior surfaces;
   placing the extrusion within a die, wherein the extrusion has a size and shape that is reduced relative to a shape of the die;
   providing pressurized water to a first set of the internal cells;
   expanding the wall portions surrounding the first set of internal cells into engagement with an internal surface of the die; and
   in response to expanding the wall portions, defining a second state of the extrusion, wherein the second state has a larger cross-sectional size and shape than the first state.

10. The method of claim 9, wherein the die includes a first portion and a second portion that, when combined, define an internal cavity, wherein the internal cavity defines an open space adjacent the first set of internal cells, and the first set of internal cells expand into the open space in response providing the pressurized water, and wherein the internal cavity defines an abutment portion corresponding to a portion of the extrusion prior to expanding the wall portion, such that the extrusion does not expand against the abutment portion.

11. The method of claim 9, wherein the first set of cells receive water therein and a second set of cells do not receive water therein.

12. The method of claim 9, wherein the die defines a recessed area defining a shape of a raised surface feature, wherein a raised surface feature is defined on an exterior surface of the extrusion in response to expanding the wall portions.

13. The method of claim 9, wherein an open space is defined around substantially the entire perimeter of the extrusion and the extrusion expands in all directions into engagement with the internal surface of the die.

14. The method of claim 9, wherein the extrusion defines a stepped shape, and an upper exterior surface of the stepped shape expands in response to providing the pressurized water.

15. The method of claim 9, wherein the structural component is a battery tray having an upper portion and a lower that define at least a portion of an internal cavity, wherein the upper portion and the portion of the battery tray are sealed with the extrusion, wherein the extrusion provides support for the upper portion and the lower portion.

16. The structural component of claim 1, wherein the at least one extrusion has a step-shaped cross-section defined by the plurality of cells.

17. The structural component of claim 4, further comprising a sealant disposed at an upper location between the top portion and the upper exterior surface and at a lower location between the bottom portion and the lower exterior surface, thereby defining a sealed interface between the top and bottom portions and the first and second sidewalls, respectively.

18. The structural component of claim 7, further comprising a sealant disposed between the top portion and the bottom portion along the combined flange, thereby defining a sealed interface between the top and bottom portions.

19. A battery frame for a vehicle, the battery frame comprising:
   a first extrusion extending along a length thereof, the first extrusion defining a first cross-sectional shape;
   a second extrusion extending along a length thereof, the second extrusion defining a second cross-sectional shape;
   wherein the first and second extrusions are spaced from each other laterally and define, at least in part, first and second sidewalls of the battery tray;
   wherein the first and second extrusions each respectively include a plurality of intersecting wall portions that define a plurality of cells extending along the first extrusion or second extrusion, respectively;
   wherein the first and second each have a first state having a first cross-sectional size and shape;
   wherein the first and second extrusion each have a second state, wherein the cross-sectional size and shape of the state is expanded relative to the cross-sectional size of the first state.

20. The battery frame of claim 19, wherein the second state includes a plurality of integral projections that are formed by expanding distinct locations of at least one of the intersecting wall portions relative to the first state, wherein the integral projections are at the distinct locations and are not extruded through the length of the first or second extrusion.

* * * * *